(No Model.)
J. HOOD & S. H. REYNOLDS.
DENTAL ENGINE.
No. 412,920. Patented Oct. 15, 1889.
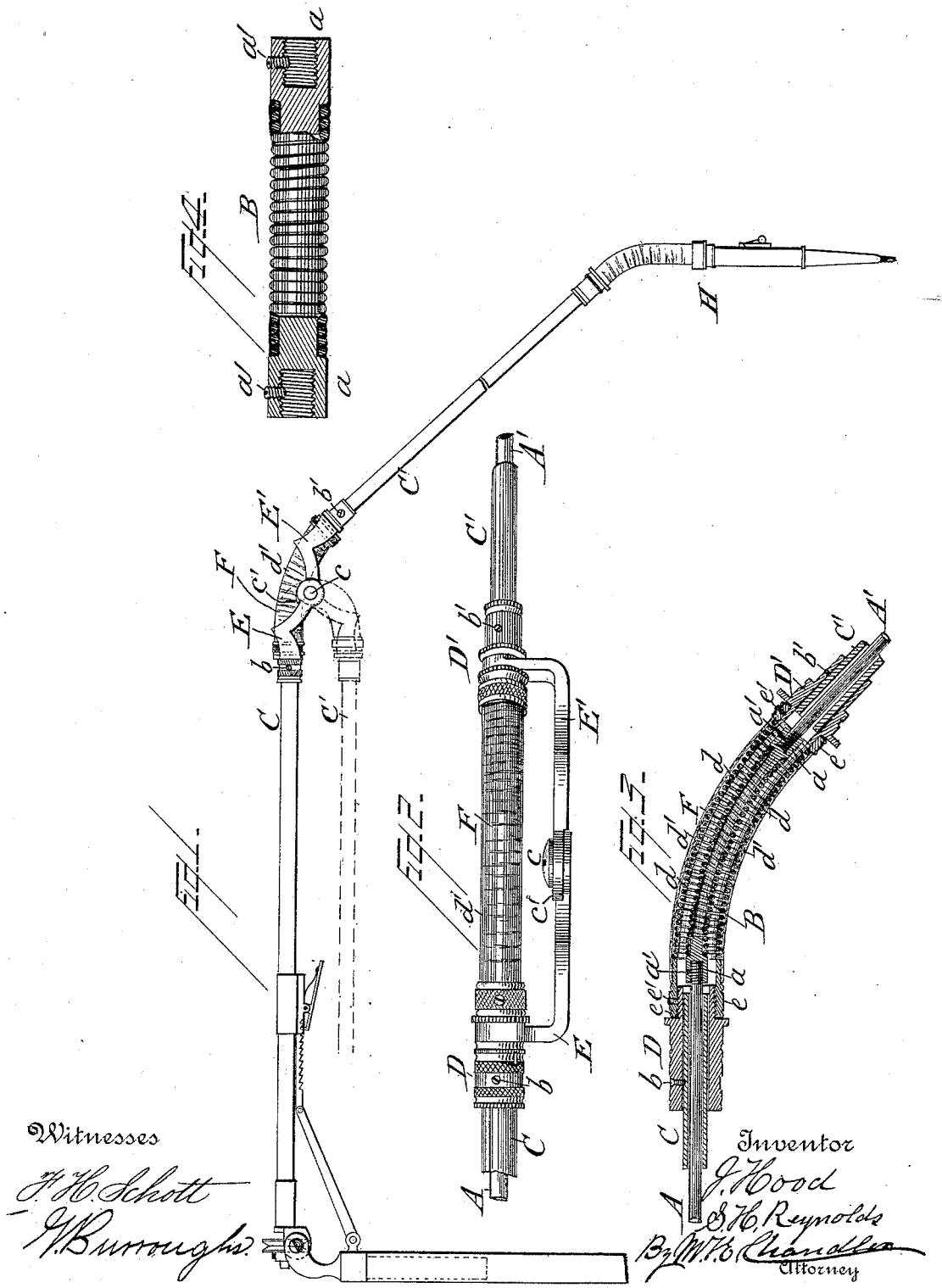
Witnesses
F. H. Schott
G. Burroughs
Inventor
J. Hood
S. H. Reynolds
By W. F. B. Chandler
Attorney ized,Patent Office.

JOHN HOOD AND STEPHEN H. REYNOLDS, OF BOSTON, MASSACHUSETTS.

DENTAL ENGINE.

SPECIFICATION forming part of Letters Patent No. 412,920, dated October 15, 1889.

Application filed December 19, 1888. Serial No. 294,033. (No model.)

*To all whom it may concern:*

Be it known that we, JOHN HOOD and STEPHEN H. REYNOLDS, citizens of the United States, residing at Boston, in the county of Suffolk and State of Massachusetts, have invented certain new and useful Improvements in Arms for Dental Engines; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in the extension-arm of dental engines, the object being to render the same flexible and at the same time durable and without any appreciable increase in the cost of construction over the arms now in common use; and the invention consists in the novel construction, arrangement, and combination of parts hereinafter described, and specifically pointed out in the claims, whereby the ends of the flexible connection are coupled to the shaft, and the construction of the connection for the outer cases, the covering of the flexible coupling, and the method of securing it to the cases are accomplished.

In the drawings which illustrate this invention, Figure 1 is a side elevation showing the arm and hand-piece complete. Fig. 2 is a plan of the flexible coupling disconnected from the shafts. Fig. 3 is a longitudinal section through the arm at the joint, illustrating the method of connecting the flexible coupling to the shafts. Fig. 4 is a view of the flexible coupling disconnected from the shafts.

In the figures, A represents that part of the shaft which receives motion directly from the belt or other device intended to impart the necessary rotary movement to the same. A' is the extension of said shaft which rotates the instrument used, and is connected with the part A by the flexible coupling B. This flexible coupling is formed of a spiral coil of wire, to the opposite ends of which are secured, by solder or other suitable means, the coupling-pieces $a$ $a$, each of which is provided with a screw-threaded cavity in its outer end to receive the screw-threaded ends of the shafts A and A', and which, after being screwed therein, are securely fastened by the set-screws $a'$, passing through the coupling-piece and bearing against the threaded part of each shaft.

The shafts A and A' are inclosed in the tubular cases C and C'. The first of these is connected at one end to the rocking head which forms the connection of the arm with the standard of the machine, its opposite end being provided with a loose ring or ferrule D, held in place upon the case, but turning freely thereon, by means of a set-screw $b$, which passes through the ferrule and enters a groove in the case C near its end. To this ferrule is attached or formed integral therewith an arm E. This arm projects at right angles for a short distance from the ferrule, then bends, and for the remainder of its length extends parallel with said ferrule and the case C, its outer extremity forming one-half of a rule-joint, which is connected with a similar formation upon the arm E' by the screw $c$, which connects the two parts of the joint. Upon one of these parts E' is formed a projection $c$, which engages with the other part E when the joint is flexed in one direction, but allows it to move freely in the opposite direction. The arm E' is of the same form and bears the same relation to the tubular case C' that the arm E does to the case C, and is connected with a ferrule D', which is slipped over and firmly secured to the case C' by a set-screw $b'$, but does not rotate on said case, being prevented from such movement by the set-screw. The flexible coupling extends between the two ends of the shafts A A' and is protected by the flexible case or cover F, formed by covering the wire coil $d$ with an outer layer of kid or equivalent material $d'$. The ends of this case F are provided with bands $e$ $e$, which slip over the ends of the ferrules D D' and are secured thereto by the set-screws $e'$, thus connecting the cases and with them forming a complete covering for the shafts and flexible coupling throughout their length, allowing the shafts to be turned in any direction desired in the manipulation of the instrument without danger of its coming in contact with the hands or clothing of the operator.

The shaft A' projects a short distance from the outer end of the case C', which, together with the shaft, is connected in the ordinary manner with the hand-piece H, carrying the instrument to be used when the machine is in operation.

Having thus described our invention, we claim as new, and desire to secure by Letters Patent, the following:

1. In an arm for dental engines, the flexible coupling B, provided with coupling-pieces at each end, in combination with their connected shafts A and A', screwed into said coupling-pieces, and set-screws, whereby said shafts are firmly fastened therein, substantially as shown and described.

2. As an improvement in arms for dental engines, the shafts A A', the flexible coupling B, and case F, consisting of the coiled spring $d$ and an outer covering, in combination with ferrules $e$ $e$ and set-screws $e'$ $e'$, all arranged substantially as and for the purpose set forth.

In testimony whereof we affix our signatures in presence of two witnesses.

JOHN HOOD.
STEPHEN H. REYNOLDS.

Witnesses:
EUGENE H. MOORE,
GEORGE H. WHEELER.